United States Patent [19]

Ichinose et al.

[11] Patent Number: 5,457,358
[45] Date of Patent: Oct. 10, 1995

[54] METHOD OF AND CIRCUIT FOR DRIVING CATHODELUMINESCENCE TYPE LIGHTING DEVICE

[75] Inventors: Shuuichi Ichinose; Tadayuki Inaoka, both of Nagano, Japan

[73] Assignees: Seiko Epson Corporation, Tokyo; Futaba Corporation, Chiba, both of Japan

[21] Appl. No.: 154,457

[22] Filed: Nov. 19, 1993

[30] Foreign Application Priority Data

Nov. 19, 1992 [JP] Japan .................................. 4-310537
Mar. 3, 1993 [JP] Japan .................................. 5-042975
Oct. 6, 1993 [JP] Japan .................................. 5-250820

[51] Int. Cl.⁶ ........................................... G09G 3/10
[52] U.S. Cl. ..................... 315/169.1; 315/169.3; 315/307
[58] Field of Search ................ 315/169.1, 169.3, 315/169.4, 167, 350, 351, 307, 77, 209 R, 287, DIG. 4, 246; 359/50; 313/492

[56] References Cited

U.S. PATENT DOCUMENTS

| 4,495,445 | 1/1985 | Turney | 315/169 |
| 4,704,560 | 11/1987 | Mills et al. | 315/169.3 |
| 4,968,917 | 11/1990 | Harris | 315/77 |
| 5,248,917 | 9/1993 | Hamagishi et al. | 315/169.1 |

OTHER PUBLICATIONS

*Patent Abstracts of Japan,* vol. 16, No. 105 (P–1325), Mar. 16, 1992 (JP–A–03 280 083).
*Patent Abstracts of Japan,* vol. 13, No. 583 (P–981) Dec. 22, 1989 (JP–A–01 245 292).

*Primary Examiner*—Ali Neyzari
*Attorney, Agent, or Firm*—Sughrue, Mion, Zinn, Macpeak & Seas

[57] ABSTRACT

A lighting device emits light by releasing electrons to an anode from a Joule-heated cathode and causes the electrons to collide against a phosphor on the anode side. A method of driving the lighting device repeats, at a predetermined lighting cycle, a heating period ($t_h$) in which the cathode is heated by conduction, a lighting period ($t_{on}$) in which the cathode is caused only to release electrons without conduction so that light is emitted, and a dummy period ($t_d$) in which no conduction or emission of light occurs at the cathode. To variably adjust the lighting period ($t_{on}$), adjustments are absorbed by the dummy period (td) to maintain the heating period ($t_h$) constant at all times. With respect to the timing control of each period, the lighting period ($t_{on}$) is controlled at a timing independent of the heating period ($t_h$), whereas the heating period ($t_h$) is controlled at a timing dependent on the lighting period ($t_{on}$). This is preferred to facilitate the timing control of the lighting period ($t_{on}$).

8 Claims, 9 Drawing Sheets

METHOD OF AND CIRCUIT FOR DRIVING CATHODELUMINESCENCE TYPE LIGHTING DEVICE

BACKGROUND OF THE INVENTION

The present invention relates to a method of and an apparatus for driving lighting devices utilizing cathodeluminescence. More particularly, the invention is directed to a method of and a circuit for driving a lighting device suitable for use as a light source for an image input apparatus such as an image scanner, a digital copying machine, or a facsimile machine, or for a large display such as an outdoor television-type display.

In lieu of conventional light sources such as fluorescent lamps and line halogen lamps used as a line light source in an image input apparatus or the like, a light source utilizing cathodeluminescence, such as disclosed in Japanese Patent Unexamined Publication No. 73970/1981, has been proposed as a light source having low power consumption.

FIG. 1 is a sectional view of a conventional cathodeluminescence type light source. The construction of the conventional light source will be described with reference to FIG. 1.

Reference numeral 10 designates a glass tube that is evacuated to a predetermined degree of vacuum. Along the length of the glass tube 10 extends a cathode 12. Reference numeral 14 designates a glass substrate, a front surface of which is coated with a phosphor 16. An anode 18 is deposited on the phosphor 16. The anode 18 is made of an aluminum thin film that serves as a metal backing. A grid 20, which is a control electrode, is interposed between the cathode 12 and the anode 18, and is made of a metal plate having slits 11 of a length of about 0.3 to 1 mm. Commonly used as the phosphor materials are those including zinc sulfide (ZnS) as a base material, such as ZnS with copper (Cu) and aluminum (Al). The light-emitting efficiency of these phosphor materials is high.

A high voltage of about 8 kV is applied to the anode 18 of the light-emitting tube by an ordinary power supply E2, whereas a voltage V4 on the order of several volts is applied to the grid 20 by a power supply E4.

A driving method will be described next. Japanese Patent Unexamined Publication No. 3740/1978 discloses a method of driving the cathodeluminescence type light source. FIG. 2 is a timing chart for driving such light source. CTLon designates a lighting signal input to a cathode drive circuit (not shown). Cathode drive signals Ek1 and Ek2, which are output signals generated from the cathode drive circuit, are applied to the terminals K1 and K2 of the cathode 12 of the light-emitting tube shown in FIG. 1. The generation of the lighting signal CTLon is repeated with a cycle time $t_0$ based on a turning-off period $t_{off}$ and a lighting period $t_{on}$.

During the turning-off period $t_{off}$, the voltages of the cathode drive signals Ek1 and Ek2 are V2 and V1, respectively. The voltages V2 and V1 are higher than the voltage V4 applied to the grid 20. When the voltages V2 and V1 are applied to the terminals K1 and K2 of the cathode 12, a difference in voltage $\Delta V = V2 - V1$ is supplied to the cathode 12 to cause the surface of the cathode to easily release thermoelectrons 24 (described later) by Joule heating.

However, since the voltages V2 and V1 applied to the terminals K1 and K2 of the cathode 12 are higher than the voltage V4 applied to the grid 20, there is no emission of thermoelectrons 24 from the cathode 12.

During the lighting period $t_{on}$, the voltages of the cathode drive signals Ek1 and Ek2 both are 0 V. Since the voltage of the cathode 12 is lower than the voltage V4 applied to the grid 20, the cathode 12 is heated by remaining heat, releasing thermoelectrons 24.

The thermoelectrons 24 pass through the slits 11 of the grid 20 and collide against the anode 18, to which the high voltage is applied. The thermoelectrons 24, having passed through the anode 18 formed of a thin film, collide against the phosphor 16, causing cathodeluminescence to occur.

The rate at which thermoelectrons are emitted from the surface of the cathode 12 depends on the surface temperature of the cathode 12. When a thermoelectron emitting substance called an emitter material (not shown) is coated on the surface of the cathode 12, thermoelectrons are usually emitted therefrom at an adequate rate at surface temperatures of 500° to 700°. However, if the temperature is too high, evaporation of the emitter material is promoted, reducing the rate of emission of thermoelectrons. As a result, the amount of light emitted from the light source is impaired drastically. On the other hand, if the temperature is too low, the emission of thermoelectrons is not sufficient. To overcome this problem, three points, namely, the conduction voltage, the cathode resistance, and the conduction duty cycle at the time of operation (i.e., the ratio of the off period $t_{off}$ to the lighting cycle $t_0$ in FIG. 2) relevant to heating the cathode must be properly selected before driving the cathode.

However, in a lighting device used for an image input apparatus or the like, the integrated value of an amount of light stored in a CCD of a photoelectric transducer of the apparatus is made adjustable by making the lighting period $t_{on}$ of the lighting device variable to increase the accuracy of the output signal from the CCD. However, if the lighting period $t_{on}$ is varied in the conventional drive circuit, the off period $t_{off}$ must also be varied (assuming the lighting cycle time $t_0$ is fixed). That is, the conduction duty cycle must be varied, which puts the surface temperature of the cathode 12 out of proper range, thus shortening the life of the light-emitting tube.

SUMMARY OF THE INVENTION

The invention has been made in view of such problems. Accordingly, an object of the present invention is to provide a method for driving a cathodeluminescence type lighting device that can adjust the lighting period variably and maintain a long life of the lighting device.

A driving method provided by the invention repeats, at a predetermined lighting cycle, the steps of: heating a cathode of the lighting device by electric conduction to the cathode; emitting light by causing the cathode to release electrons without conduction to the cathode; and reposing without causing the cathode to release electrons with no conduction to the cathode. At least the period of the light-emitting step and the period of the reposing step are variable.

Further, a driving circuit provided by the invention includes: a first control section for controlling a potential of a first terminal of the cathode; and a second control section for controlling a potential of a second terminal of the cathode. The first control section and the second control section operate during a lighting period, a heating period, and a dummy period. The lighting period, the heating period, and the dummy period are repeated at a predetermined lighting cycle and are successively generated. The first control section controls the potential of the first terminal to a potential lower than a potential of the control grid during the lighting period, and controls the potential of the first terminal to a potential higher than the potential of the control grid during the periods other than the lighting period. The second control section controls the potential of the second terminal to a potential higher than the potential of the control grid and different from the potential of the first terminal during the heating period, and controls the potential of the second terminal to a potential equal to the potential of the first terminal during the periods other than the heating period.

The invention is characterized as having the heating period, the lighting period, and the reposing period in a single lighting cycle. When the lighting period is adjusted variably, the heating period can be maintained constant by varying the reposing period in accordance with the adjustment of the lighting period. Therefore, even if the lighting period is adjusted, the temperature of the cathode can be maintained within a proper range, thereby contributing to extending the service life of the light-emitting tube.

DESCRIPTION OF THE PREFERRED EMBODIMENTS

Preferred embodiments of the invention will hereunder be described in detail with reference to the drawings.

Figure 1:
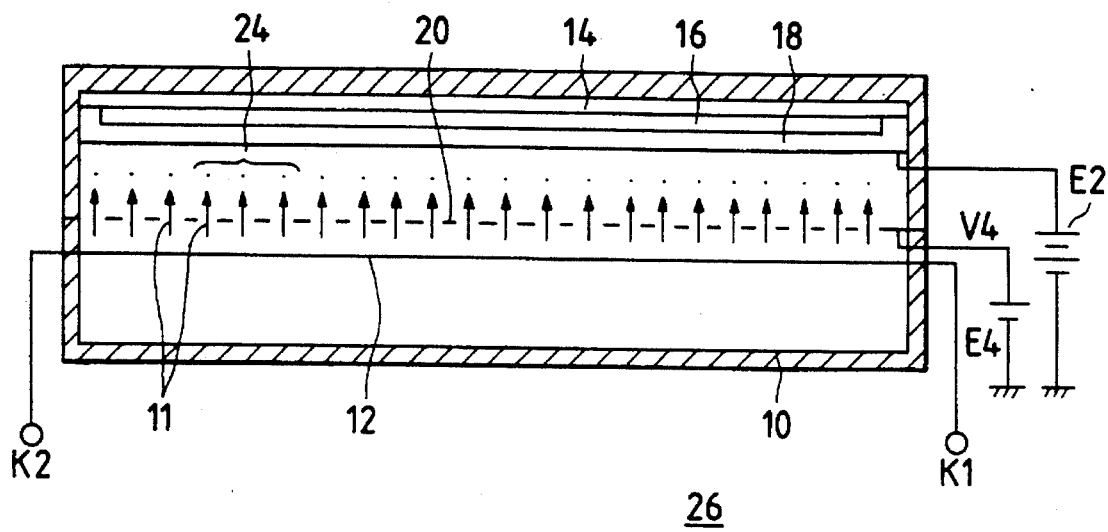
FIG. 1 is a sectional view showing the construction of a conventional light source utilizing cathodeluminescence.
Figure 2:
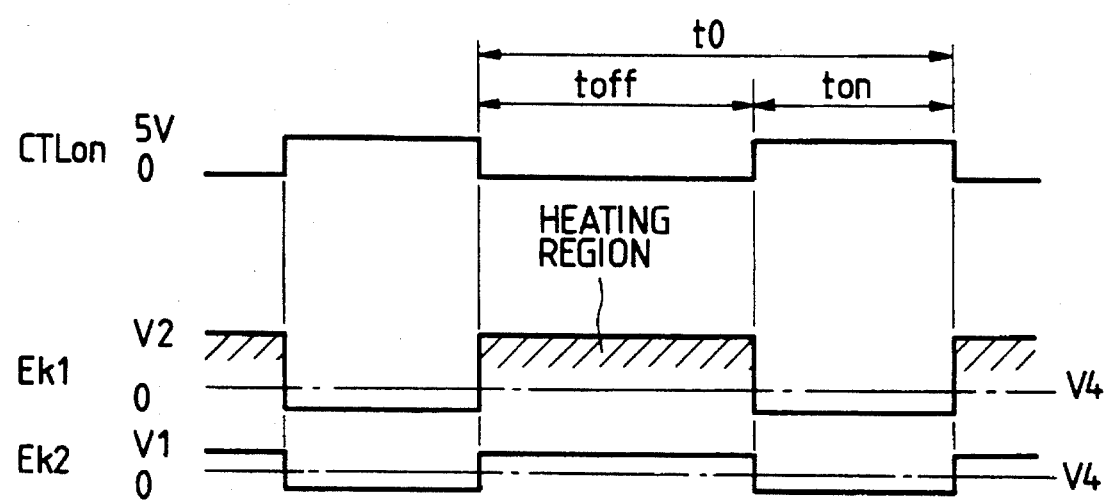
FIG. 2 is a timing chart of a cathode drive circuit in the conventional light source.
Figure 3:
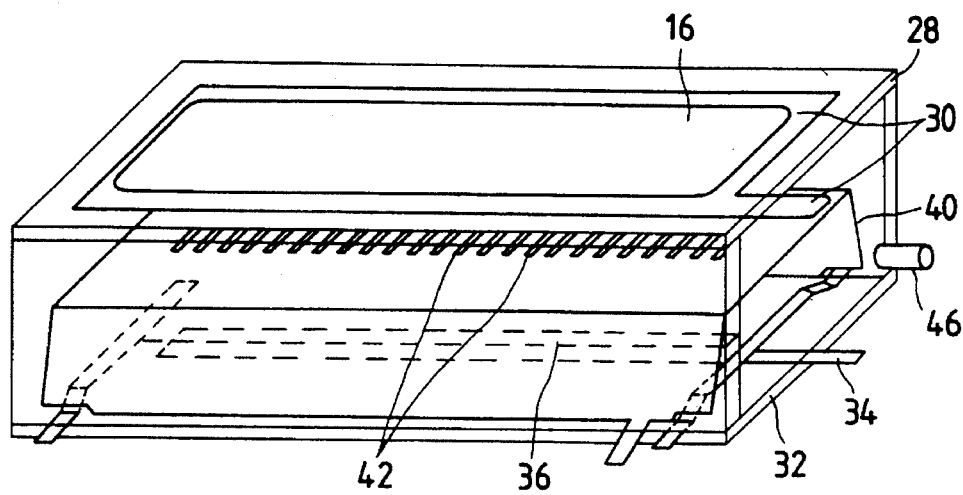
FIG. 3 is a perspective view showing an example of a light-emitting tube to which a drive circuit of the invention is applied.

FIG. 3 is a perspective view showing an example of a cathodeluminescence type lighting tube to which a drive circuit of the invention is applied. A phosphor 16 for cathodeluminescence is coated on the inner surface of a front plate 28 of the light-emitting tube 26 in quantities of 0.1 to 100 mg/cm$^2$, most preferably 4 mg/cm$^2$, along the length of the light-emitting tube 26. The phosphor 16 is covered with an anode 30 made from aluminum, the anode being formed by vacuum evaporation in thicknesses of 0.1 to 0.4 μm.

A back electrode 34 extends on the inner surface of a back plate 32 of the light-emitting tube 26 along the length of the back plate 32. The back electrode 34 is made from aluminum by vacuum evaporation or the like. Immediately above the back electrode 34 is a wire-like cathode 36. The cathode 36 is a tungsten thin wire 50 to 100 μm in diameter. An emitter material (not shown) is coated on the surface of the cathode 36. A grid 40 made of a metal plate that has a plurality of apertures 42 formed by blanking, electroforming or the like, is arranged at such a position as to shield the anode 30 from the cathode 36. The anode 30, the grid 40, the cathode 36, and the back electrode 34 are electrically driven to conduct by a drive circuit 44 (described later) via a terminal that extends externally from the light-emitting tube. Reference numeral 46 designates an evacuating tube that evacuates the light-emitting tube to a pressure of about 100 to 0.1 mPa. The light-emitting tube is thereafter sealed by melting the evacuating tube 46 by heating with a gas burner.

Figure 4:
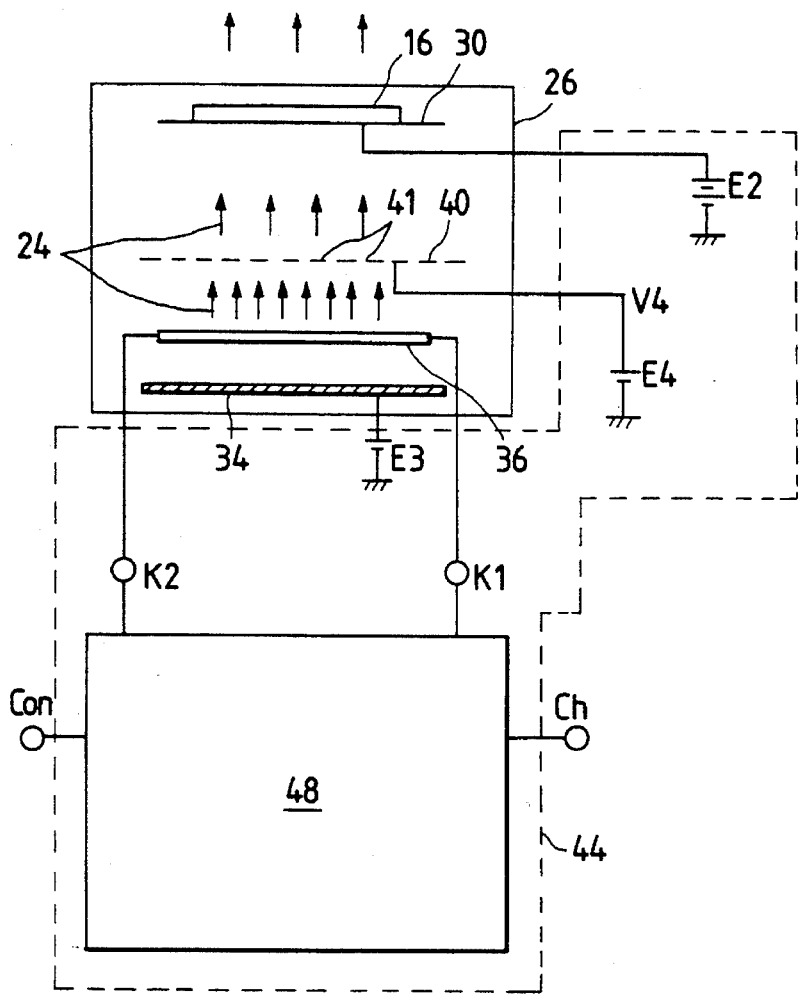
FIG. 4 is a diagram showing in block form an exemplary drive circuit of the invention for the light-emitting tube shown in FIG. 3, together with a schematic sectional view of the light-emitting tube.

FIG. 4 shows in block form an example of a drive circuit of the invention for the light-emitting tube 26 shown in FIG. 3, together with a schematic sectional view of the light-emitting tube 26.

A drive circuit 44 includes three dc constant voltage power supplies E2 to E4 and a cathode drive circuit 48 for lighting control.

A high voltage on the order of 8 kV is applied to the anode 30 by the power supply E2. A voltage V4 on the order of several volts is applied to the grid 40 by the power supply E4. An appropriate voltage is applied to the back electrode 34 by the power supply E3. Such voltages are applied to maximize the amount of thermoelectrons emitted by the cathode 36. Both terminals K1 and K2 of the cathode 36 are connected to the cathode drive circuit 48.

Figure 5:
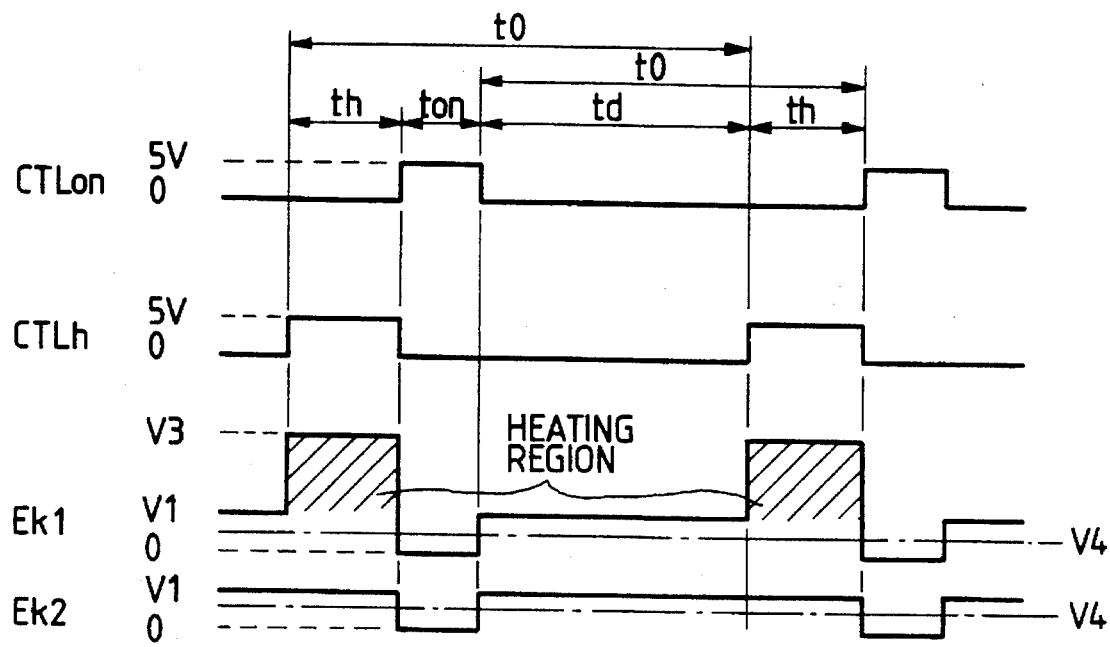
FIG. 5 is a timing chart illustrating the operation of a cathode drive circuit within the drive circuit of FIG. 4.

FIG. 5 is a timing chart illustrating the operation of the cathode drive circuit 48. CTLon and CTLh designate signals input to a lighting signal input terminal Con and a heating signal input terminal Ch, respectively. Reference characters Ek1 and Ek2 designate drive voltage signals supplied to the terminals K1 and K2, respectively.

During a period $t_h$ (heating period), the cathode drive voltage signal Ek1 is a predetermined voltage V3 (e.g., 23 V), and the other cathode drive voltage signal Ek2 is a predetermined voltage V1 (e.g., 8 V). Then, a difference in voltage $\Delta V = V3 - V1$ is produced between the terminals K1 and K2 of the cathode 36, enabling the surface of the cathode 36 to easily emit thermoelectrons 24 by Joule heating.

However, since the voltages V3 and V1 respectively applied to the terminals K1 and K2 of the cathode 36 are higher than the potential V4 applied to the grid 40, no thermoelectrons 24 are emitted from the cathode 36.

Then, during a period $t_{on}$ (lighting period), which is between the moment at which the lighting signal CTLon rises from 0 V to 5 V and the moment at which the lighting signal CTLon drops to 0 V again, both cathode drive voltage signals Ek1 and Ek2 are 0 V, which makes the voltage at the cathode 36 lower than the applied voltage V4. As a result, the thermoelectrons 24 are released from the cathode 36 heated by the remaining heat. The thermoelectrons 24 pass through the apertures 42 of the grid 40 and collide against the anode 30 to which a high voltage has been applied. Further, the thermoelectrons 24 having passed through the anode 30 made of a thin film then collide against the phosphor 16 to produce cathodeluminescence.

Lastly, during a period $t_d$ (dummy period), the lighting signal CTLon and the heating signal CTLh are both at 0 V. As a result, the voltage of both cathode drive signals Ek1 and Ek2 is V1. Since there is no difference in voltage between both terminals of the cathode 36, the cathode 36 is not heated in a manner similar to the lighting period $t_{on}$. Further, since the voltage V1 applied to the terminals K1 and K2 of the cathode 36 is higher than the voltage V4 applied to the grid 40, no thermoelectrons 24 are emitted from the cathode 36.

In this timing chart, to variably adjust the lighting period $t_{on}$, the cycle time $t_0$ and the heating period $t_h$ are fixed, whereas the lighting period $t_{on}$ is varied within the range of $t_0$–$t_h$. Accordingly, only the luminous duty cycle can be varied with the heating duty cycle maintained constant.

Figure 6:
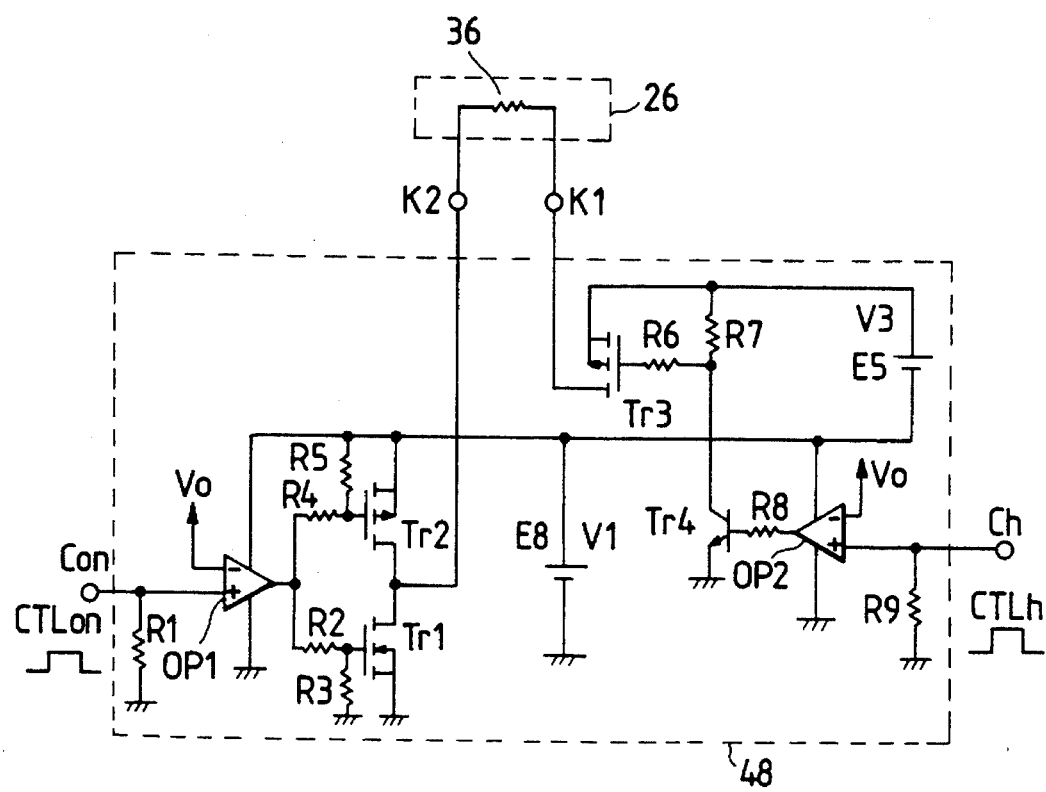
FIG. 6 is a circuit diagram showing an example of the cathode drive circuit performing the operation of FIG. 5.

FIG. 6 shows an exemplary circuit of the cathode drive circuit 48 shown in FIG. 5.

This cathode drive circuit 48 has two operational amplifiers OP1 and OP2, to which the dc voltage V1 is applied by a power supply E8 as a supply voltage. A threshold voltage V0 (e.g., 1.5 V) is applied to both inverting input terminals (–).

One of the operational amplifiers OP1 has a non-inverting input terminal (+) connected to the signal input terminal Con so that the lighting signal CTLon can be received thereby, and the output terminal thereof is connected to the control gates of two complementary transistors Tr1 and Tr2 through a set of dividing resistors R2 and R3 and through a set of dividing resistors R5 and R4, respectively. The output terminals of the complementary transistors Tr1 and Tr2 are connected to the cathode terminal K2.

The other operational amplifier OP2 has a non-inverting input terminal (+) connected to the signal input terminal Ch so that the heating signal CTLh can be received thereby, and the output terminal thereof connected to the base of a switching transistor Tr4 through a resistor R8. The emitter of the switching transistor Tr4 is grounded, and the collector thereof is connected to the control gate of the transistor Tr3 through a resistor R6. The voltage V3 which is a voltage combination of the voltage V1 of the power supply E8 with a voltage of the power supply E5 is applied to the control gate of the transistor Tr3 through a resistor R7. The voltage V3 is also applied to the source of the transistor Tr3. The drain of the transistor Tr3 is connected to the other cathode terminal K1.

The operation of the circuit will be described below. An operation during the heating period $t_h$ will be described first.

When the heating signal CTLh has risen to 5 V from 0 V, the output voltage of the operational amplifier OP2 rises to V1 from 0 V, which causes the transistor Tr4 to turn on and the potential of a node of the resistors R7 and R6 to become almost 0 V. Then, since the transistor Tr3 turns on, the voltage V3 is applied to the terminal K1 of the cathode 36.

During this heating period $t_h$, the output voltage of the operational amplifier OP1 is 0 V. As a result, the transistor Tr1 turns off, whereas the transistor Tr2 turns on, which causes the power supply E8 to apply the voltage V1 to the terminal K2 of the cathode 36.

As the voltages V3 and V1 are then applied to the terminals K1 and K2 of the cathode 36, the cathode 36 is heated with current passing therethrough.

The operation of the circuit during the lighting period $t_{on}$ will be described next.

When the lighting signal CTLon has risen to 5 V from 0 V, the output voltage of the operational amplifier OP1 becomes V1. Since this causes the transistor Tr1 to turn on and the transistor Tr2 to turn off, the voltage at the terminal K2 of the cathode 36 is almost 0 V.

Since the heating signal CTLh is at 0 V in this instance, the output voltage of the operational amplifier OP2 is 0 V, leaving the transistor Tr4 turned off. As a result, the transistor Tr3 is turned off, which opens the current loop flowing through the cathode 36. Consequently, the terminal K1 of the cathode 36 is at 0 V, which is equal to the potential at the terminal K2.

The operation of the circuit during the dummy period ($t_d$) will be described.

When the lighting signal CTLon has dropped to 0 V from 5 V, the output voltage of the operational amplifier OP1 drops to 0 V. Then, the transistor Tr1 is turned off, and the transistor Tr2 turns on, causing the voltage at the terminal K2 of the cathode 36 to become the voltage V1 of the power supply E8.

Since the heating signal CTLh is at 0 V at this time, similar to the lighting period $t_{on}$, the current loop flowing through the cathode 36 is open. As a result, the potential at the terminal K1 of the cathode 36 is V1, which is equal to the potential at the terminal K2.

In the drive circuit shown in FIGS. 5 and 6, the heating duty cycle of the cathode 36 is $t_h/t_0$. Thus, if the lighting cycle $t_0$ and the heating period $t_h$ are kept constant at all times, then the heating duty cycle is constant, thereby keeping the surface temperature of the cathode within a predetermined range. The lighting period $t_{on}$ can be variably adjusted independently of the heating period $t_h$ by using the dummy period $t_d$.

The variable range of the lighting period $t_{on}$ is between 0 and $t_0$14 $t_h$. Therefore, the variable range of the lighting period $t_{on}$ can be increased by increasing the voltage V3 of the cathode drive signal Ek1 during the heating period $t_h$ shown in FIG. 5 as much as possible, so that the heating duty cycle can be decreased, i.e., the period $t_h$ can be shortened as much as the voltage V3 is increased.

Figure 7:
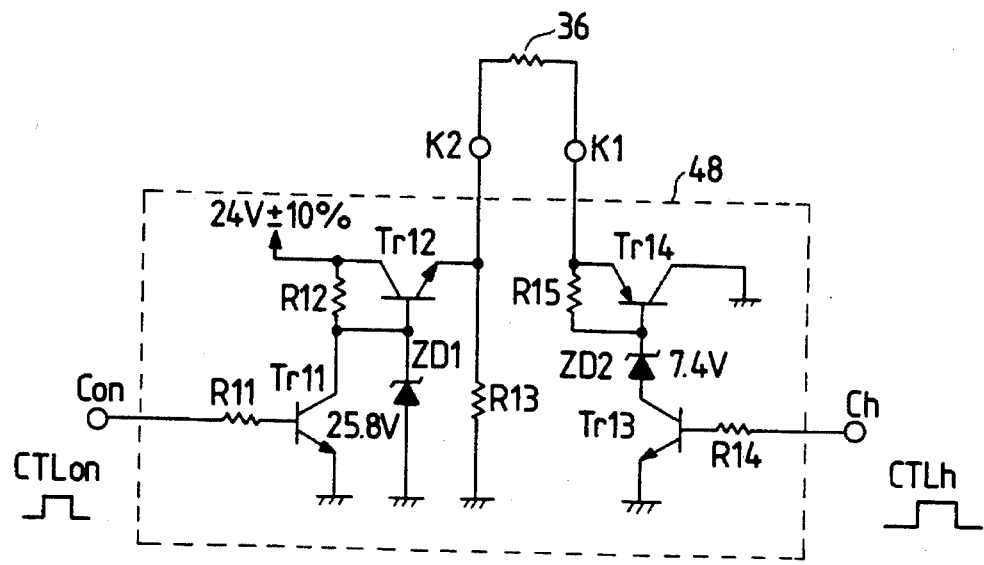
FIG. 7 is a circuit diagram showing another example of the cathode drive circuit within the drive circuit of FIG. 4.
Figure 8:
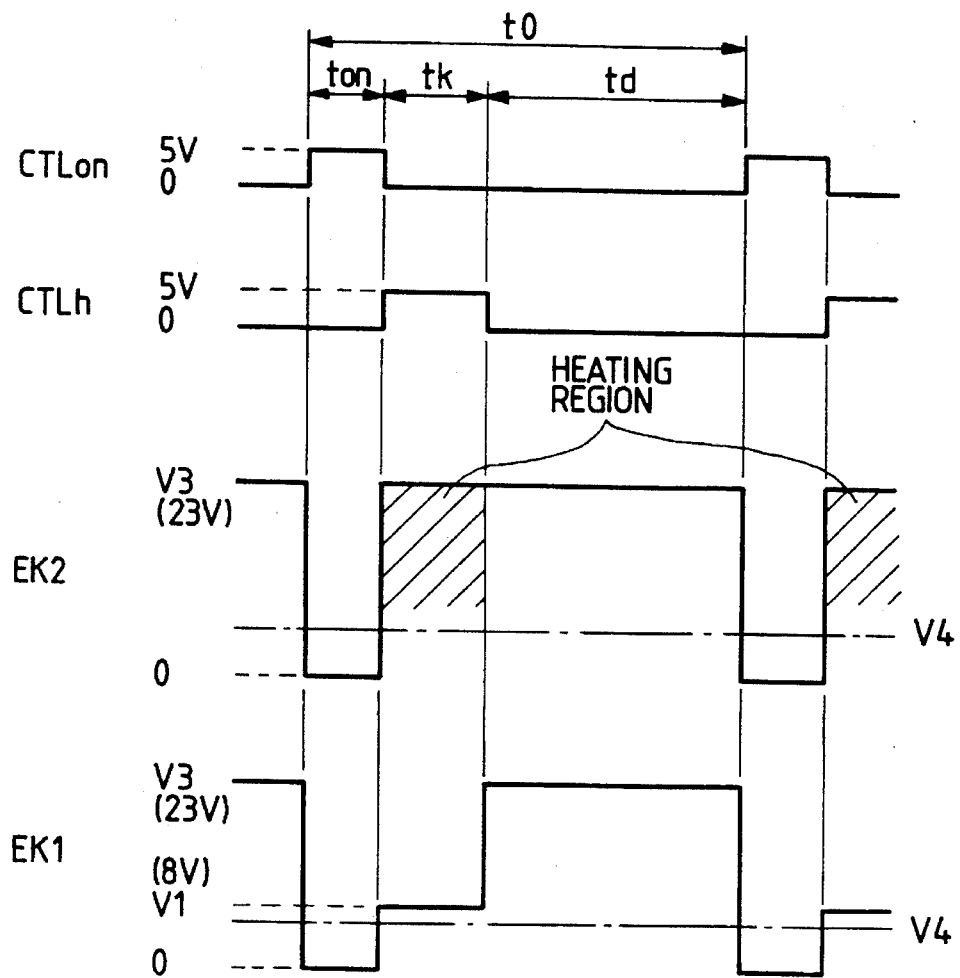
FIG. 8 is a timing chart illustrating the operation of the cathode drive circuit of FIG. 7.

FIG. 7 shows another exemplary circuit that can be used as the cathode drive circuit 48 of FIG. 4, and FIG. 8 is a timing chart showing an operation thereof.

The circuit shown in FIG. 7 is advantageous in that the construction thereof is simpler than the circuit shown in FIG. 6.

Further, the operation shown in FIG. 8 has a feature that the lighting period $t_{on}$ comes first and that the heating period $t_h$ starts in response to the end of the lighting period $t_{on}$. More specifically, the lighting signal CTLon is generated at an independent timing, whereas the heating signal CTLh is generated at a timing dependent on the lighting signal CTLon. One of the advantages in this system is that when the lighting device is used as a light source of an image input apparatus, the image reading period can be easily synchronized with the lighting period. The reason is that the lighting signal CTLon can be generated in direct synchronism with a pulse signal that is generated by the image input apparatus and synchronized with the reading period. In contrast thereto, in the operation shown in FIG. 5, the lighting signal CTLon is generated at a timing dependent on the heating signal CTLh causing the lighting signal CTLon to rise upon dropping of the heating signal CTLh. Therefore, the lighting signal CTLon cannot be generated in direct synchronism with the pulse signal from the image input apparatus.

The circuit illustrated in FIG. 7 will be described below.

A transistor Tr11 receives the lighting signal CTLon on the base thereof through a resistor R11. The emitter thereof is grounded, and the collector thereof is connected to a dc constant voltage supply (e.g., 24 V±10%) through a resistor R12 and to the base of a transistor Tr12. The transistor Tr12 is connected to the above-mentioned dc constant voltage supply; the emitter thereof is connected to the terminal K2 of the cathode and grounded through a resistor R13. Between the base of the transistor Tr12 and ground is connected a zener diode ZD1 whose zener voltage is, e.g., 25.8 V and whose function is to clamp variations in the dc voltage supply on the high side of the nominal voltage.

A transistor Tr13 receives the heating signal CTLh on the base thereof through a resistor R14. The emitter thereof is grounded, and the collector is connected to the base of a transistor Tr14 through a zener diode ZD2 whose zener voltage is, e.g., 7.4 V and which is connected in the forward direction. The transistor Tr14 has a resistor R15 interposed between the emitter and the base thereof, with the emitter connected to the terminal K1 of the cathode and the collector grounded.

The operation of the circuit will be described with reference to FIGS. 7 and 8.

As shown in FIG. 8, upon initiation of the lighting cycle $t_0$, the lighting signal CTLon rises to 5 V from 0 V and drops to 0 V after a predetermined lighting period $t_{on}$. In response to the drop of the lighting signal CTLon, the heating signal CTLh rises to 5 V from 0 V and drops to 0 V after a predetermined heating period $t_h$.

Referring to FIG. 7, upon rising of the lighting signal CTLon at the start of the lighting period $t_{on}$, the transistor Tr11 turns on and the transistor Tr12 turns off. As a result, the terminal K2 of the cathode 36 is grounded to be at 0 V, as shown in FIG. 8.

Since the heating signal CTLh is at 0 V at this time, the transistor Tr13 is turned off, which means that the transistor Tr14 is turned off as well. Therefore, the current loop flowing through the cathode 36 is open. As a result, the potential at the cathode terminal K1 becomes 0 V, which is equal to the potential at the other terminal K2.

In this way, the voltage of each of the terminals K1 and K2 of the cathode 36 is 0 V, that is, lower than the grid voltage V4 during the lighting period $t_{on}$, so that electrons are emitted from the already-heated cathode 36 and collide against the phosphor of the anode after being accelerated by the grid. As a result, the emission of light starts.

At the end of the lighting period $t_{on}$, the lighting signal CTLon drops, and simultaneously therewith the heating signal CTLh rises. When the lighting signal CTLon drops, the transistor Tr11 turns off, which causes the transistor Tr12 to turn on. As a result, the potential of the cathode terminal K2 connected to the emitter of the transistor Tr12 becomes almost 23 V (V3), which is obtained by subtracting the voltage drop of the transistor Tr12 from the power supply voltage (24 V)

Further, since the transistor Tr13 turns on and the transistor Tr14 turns on at the rising of the heating signal CTLh, the potential of the cathode terminal K1 becomes almost 8 V (V1), which is obtained by adding a base-emitter voltage of the transistor Tr13 to the zener voltage 7.4 V.

In this way, the voltage of one terminal K2 of the cathode 36 is 23 V (V3) and that of the other terminal K1 is 8 V (V1) during the heating period $t_h$, which causes current to flow through the cathode 36 to heat the cathode 36. However, since the potential V3 of the cathode 36 is higher than the potential V4 of the grid, no electrons are emitted.

At the end of the heating period $t_h$, the heating signal CTLh drops. As a result, both transistors Tr13 and Tr14 turn off, which in turn opens the current loop passing through the cathode 36. Since the voltage of the cathode terminal K2 is 23 V (V3) at this time, which is equal to that during the heating period, the voltage of the terminal K1 becomes 23 V (V3) as well. Therefore, no current flows through the cathode 36, which means that the cathode 36 is not heated. In addition, since the potential V3 of the cathode 36 is higher than the potential V4 at the grid, there is no emission of light.

The above describes the embodiments applied to the lighting device shown in FIG. 3 for the emission of light of a single color.

Embodiments of the invention to be applied to a lighting device for the emission of light of three colors, which can be used for a color image input apparatus, will be described next.

Figure 9:
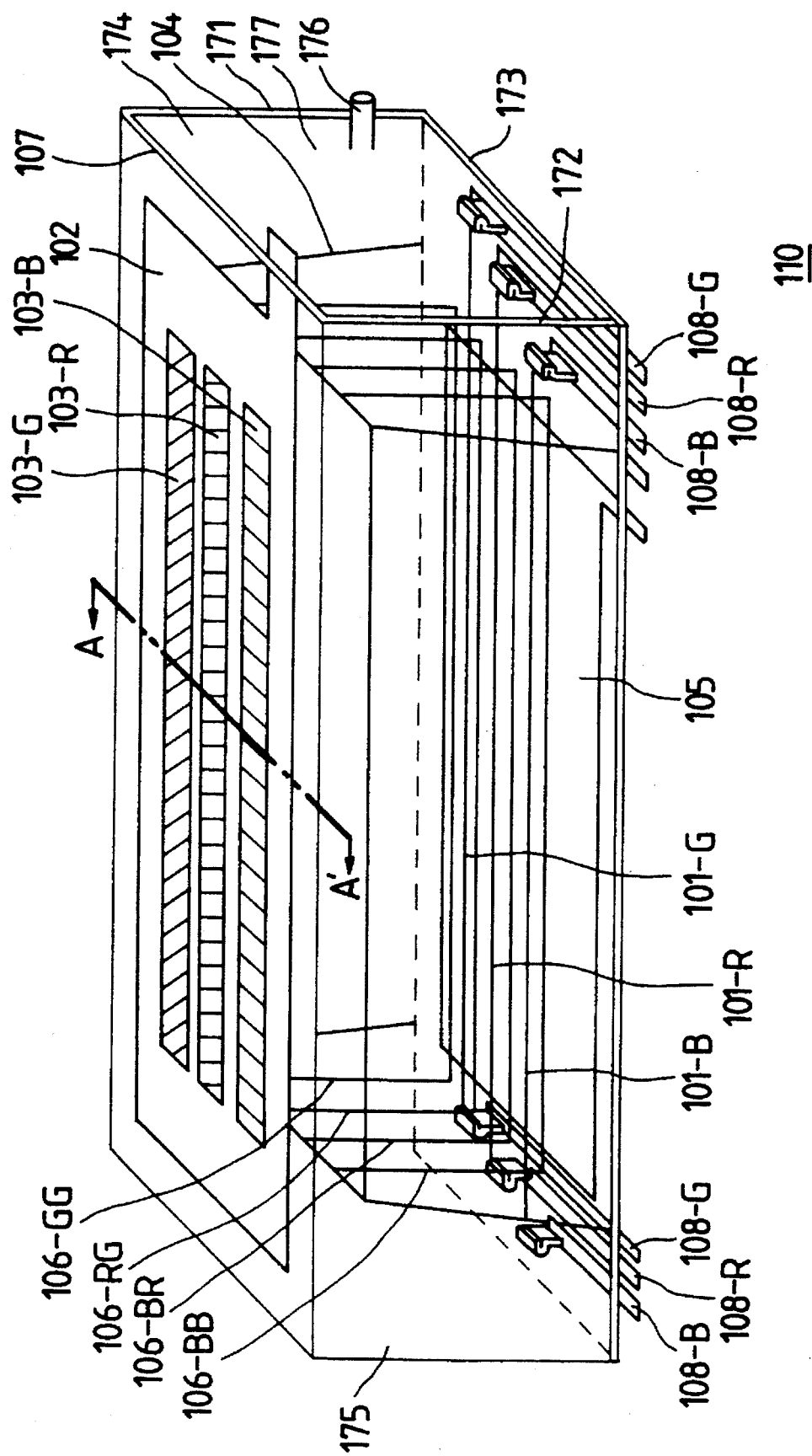
FIG. 9 is a perspective view showing a light-emitting tube 110 of a lighting device for a color image input apparatus to which a drive circuit of the invention is applied.

FIG. 9 is a perspective view of an example of a light-emitting tube 110 used as a lighting device for a color image input apparatus to which the invention can be applied.

Figure 10:
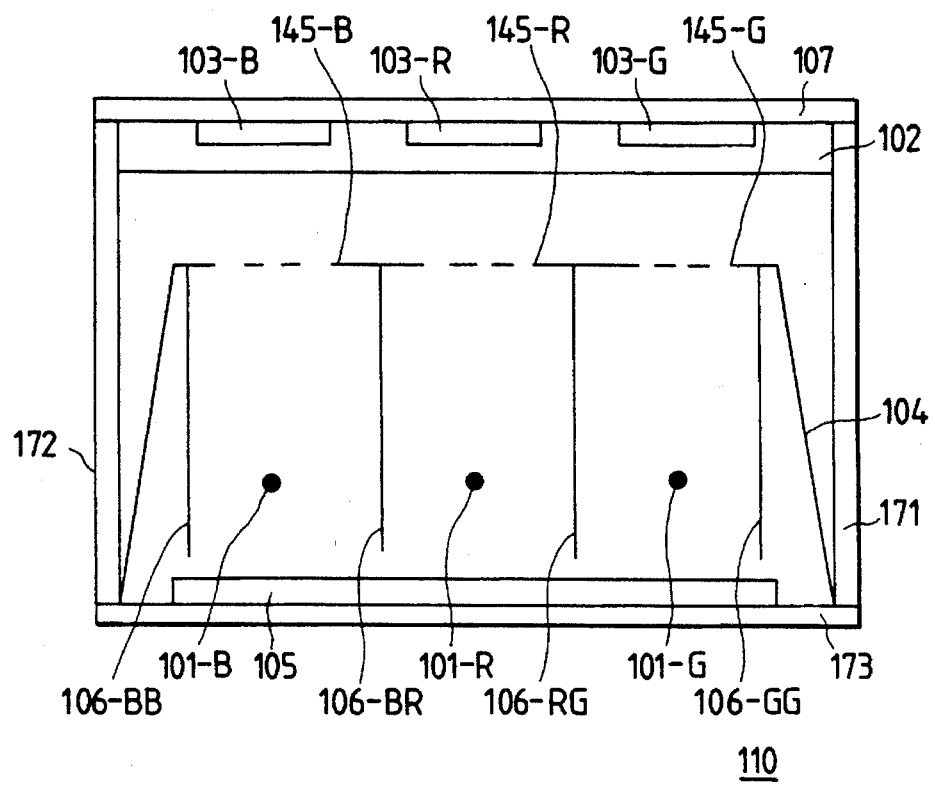
FIG. 10 is a sectional view taken along a line A—A' of FIG. 9.
Figure 11:
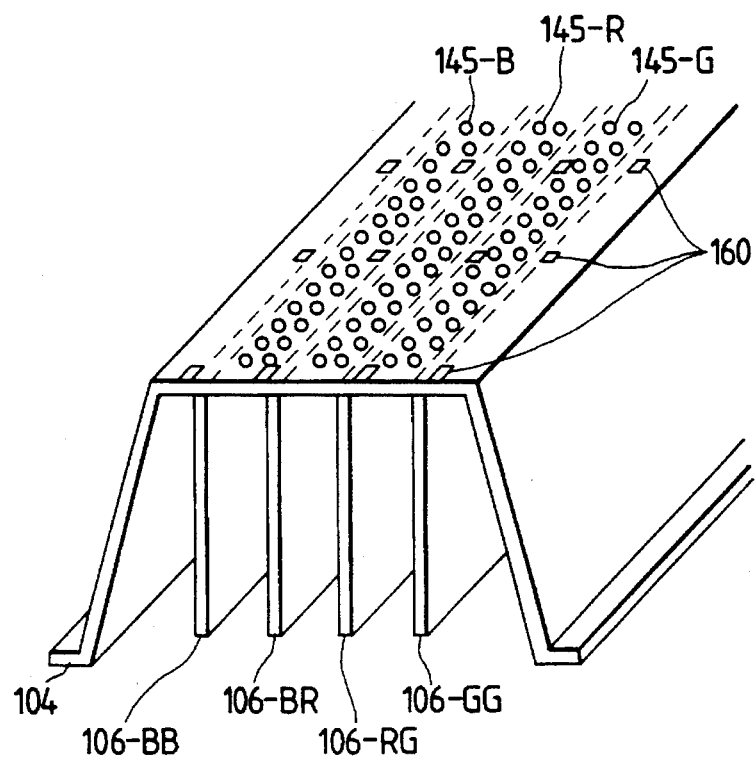
FIG. 11 is a partially enlarged view showing a grid electrode 104 and separators 106-BB, 106-BR, 106-RG, and 106-GG in FIG. 9.

FIG. 10 is a sectional view taken along a line A—A' in FIG. 9, and FIG. 11 is a partially enlarged view showing a grid electrode 104 and separators 106-BB, 106-BR, 106-RG, and 106-GG in FIG. 9.

The construction of the light-emitting tube 110 will be described below. Red, green, and blue cathodes 101-R, 101-G, and 101-B extend between the grid electrode 104 and a back electrode 105 (both described later) while being supported by cathode support members 108-R, 108-G, and 108-B on both ends thereof, respectively. The cathodes 101-R, 101-G, and 101-B are thin tungsten wires 10 to 50 μm in diameter. The surface of each cathode is coated with an electron emitting substance (not shown) such as barium oxide or the like. The function of the coating is to improve electron emitting efficiency.

The grid electrode 104 is located between the cathodes 101-R, 101-G, 101-B and an anode 102 by bending a plate in trapezoidal form, the plate being electrically conductive such as stainless steel, brass, or aluminum, as well as nonmagnetic. As shown in FIG. 10, the grid electrode 104 is fixed by clamping with glass side plates 171, 172 and a bottom plate 173. As shown in FIG. 11, the grid electrode 104 has four separators 106-BB, 106-BR, 106-RG, 106-GG for partitioning the cathodes. The separators are fixed at a plurality of fixing points 160. These separators are electrically conductive with the grid electrode 104. Further, on a side of the grid electrode 104 which is opposite to the anode are a plurality of net-like or slit-shaped apertures 145-R, 145-G, 145-B for allowing electrons to pass therethrough, the electrons being generated by the cathodes 101-R, 101-G, 101-B.

Figure 12:
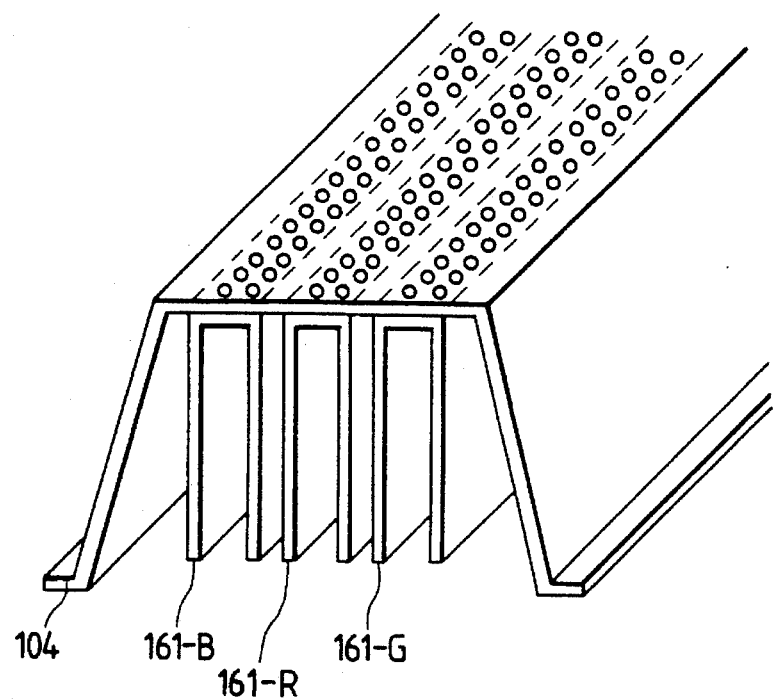
FIG. 12 is a partially enlarged view showing the grid electrode 104 and inverted C-shaped separators 161-B, 161-R, and 161-G, which can be applied to the light-emitting tube of FIG. 9.

Each separator 106 flexes between the fixing points 160 when thermally expanded by heat radiated from the cathode. This causes an inconsistent amount of light. It is desirable to increase the number of fixing points 160 to suppress the flexing as much as possible. Further, it is desirable to bend the upper edge part, the lower edge part, or both of each separator 106 in L form so that the separator 106 becomes hard to flex. Otherwise, as shown in FIG. 12, inverted C-shaped separators 161-B, 161-R, and 161-G may be used.

The back electrode 105 is formed between the cathodes 101-R, 101-G, and 101-B and the glass bottom plate 173. The back electrode 105 is made of carbon paste.

Phosphors of three kinds, namely, a green-emitting phosphor 103-G, a red-emitting phosphor 103-R, and a blue-emitting phosphor 103-B, are sequentially coated on the inner surface of a transparent glass plate 107 by means of screen printing or the like. The phosphors used here are those capable of emitting light by cathodeluminescence, such as yttrium oxysulfide ($Y_2O_2S$) with europium (Eu) or samarium (Sm) as the red-emitting phosphor, zinc sulfide (ZnS) with copper (Cu) and aluminum (Al) as the green-emitting phosphor, zinc sulfide (ZnS) with silver (Ag) and chlorine (Cl) as the blue-emitting phosphor, and the like.

The anode 102 is formed by depositing a 1 to 10 μm thick layer of aluminum on the inner surface of the phosphor-coated transparent glass plate 107 by means of vacuum evaporation or the like.

Lastly, the surfaces of the glass parts in contact and the interface of the leads externally extending from the light-emitting tube 110 from each electrode are closed with low-melting point glass or the like, put in a high-temperature vessel at 500° to 600° to be fused so that a container 177 including the transparent plate 107, the glass plates 171, 172, 173, 174, and 175 shown in FIG. 9 is formed. Then, when the container 177 is evacuated to a range of 100 to 0.1 mPa by an evacuating tube 176, the container 177 is sealed to maintain the evacuated condition therewithin.

The three-color light-emitting tube 110, when used as a light source for a color image input apparatus, injects light in three colors to a single direction from a substantially single light source. As a result, even if an original having steps or irregularities on the surface is input, excellent color reproduction free from color mismatching can be obtained.

Figure 13:
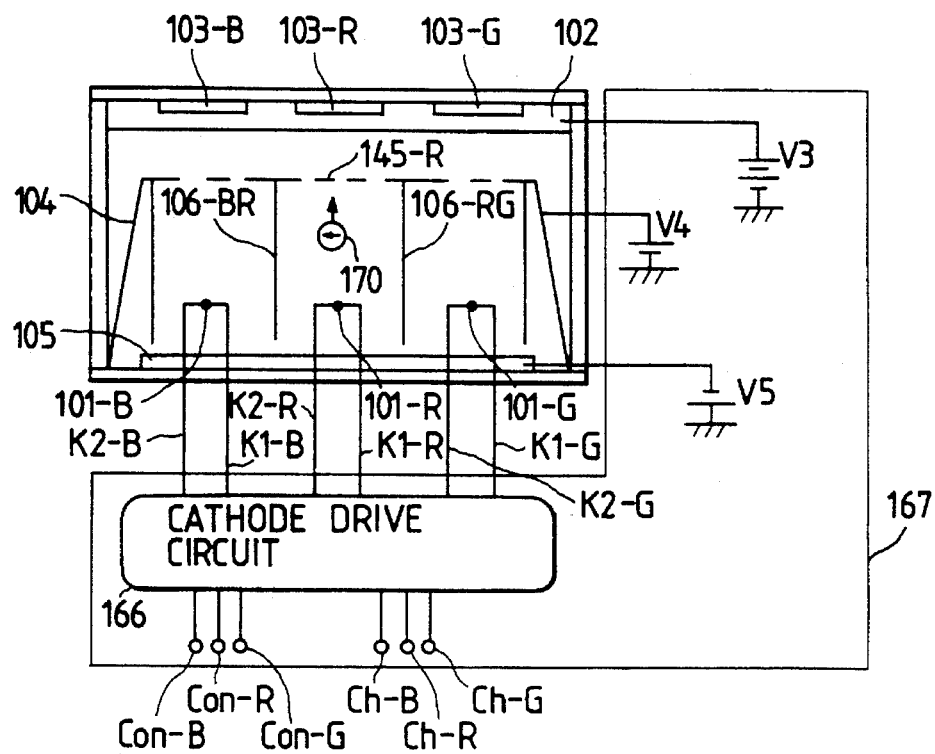
FIG. 13 is a diagram showing in block form an example of a drive circuit of the invention for the light-emitting tube 110 together with a partial sectional view of the light-emitting tube 110.

FIG. 13 shows in block form a drive circuit of the invention for independently producing emissions of light from the phosphors 103-R, 103-G, and 103-B for the respective colors of such light-emitting tube 110.

A drive circuit 167 shown in FIG. 13 includes three dc constant voltage power supplies and a cathode drive circuit 166. The respective cathodes 101-R, 101-G, and 101-B are connected to the cathode drive circuit 166 at both terminals K1-R, K2-R, K1-G, K2-G, K1-B, and K2-B.

Figure 14:
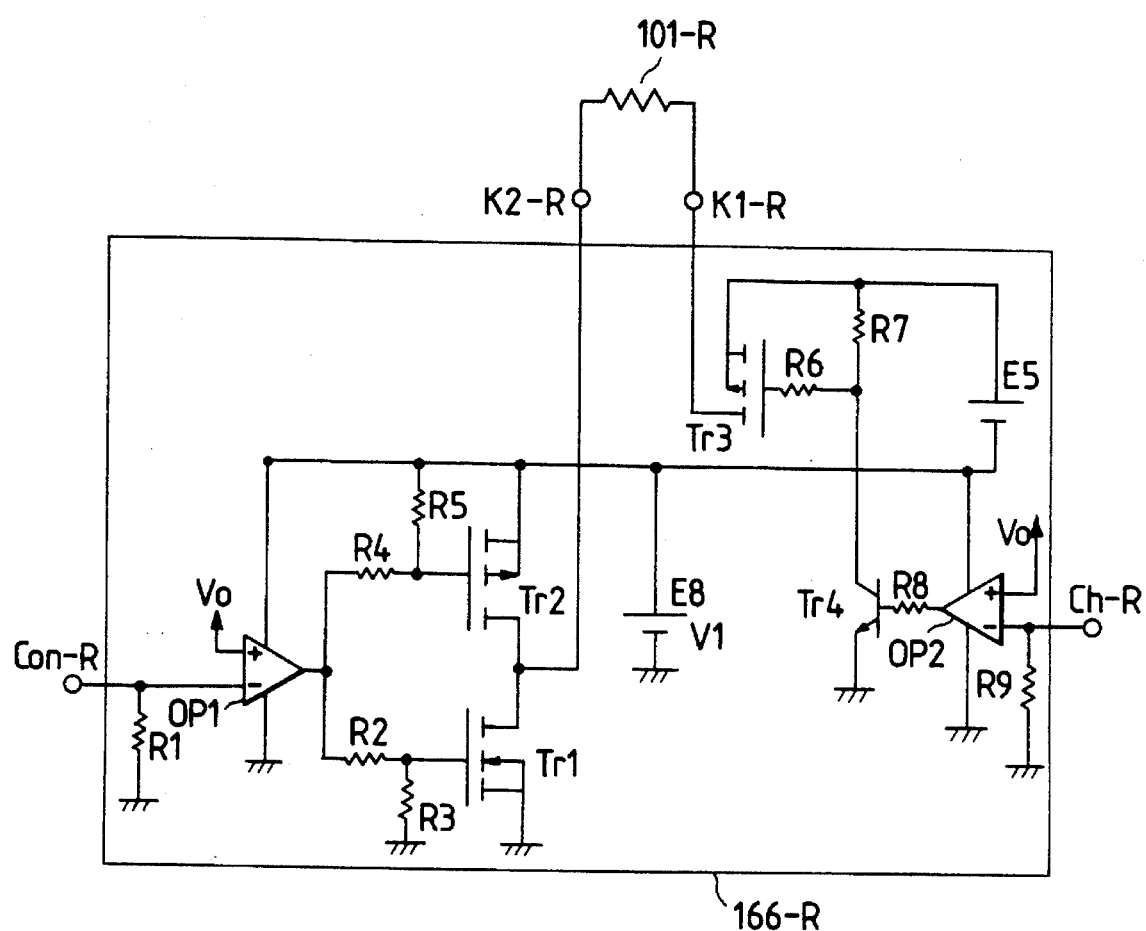
FIG. 14 is a circuit diagram of a red light-emitting circuit 166-R within the cathode drive circuit 166 of FIG. 13.

FIG. 14 is a circuit diagram of the cathode drive circuit 166. A circuit 166-R in FIG. 14 drives the cathode 101-R for the red color. Two other circuits (of the same construction) are arranged in parallel to drive the cathode 101-G for the green color and the cathode 101-B for the blue color. The three cathodes 101-R, 101G, and 101-B are driven independently by these three circuits.

The circuit shown in FIG. 14 is the same as the cathode drive circuit for the single color light-emitting tube shown in FIG. 6. A lighting signal input terminal Con-R and a heating signal input terminal Ch-R receive a lighting signal CTL-R and a heating signal CTL-Rh for red (see FIG. 15), respectively. The cathode terminals K1-R and K2-R are connected to the cathode 101-R for red.

Figure 15:
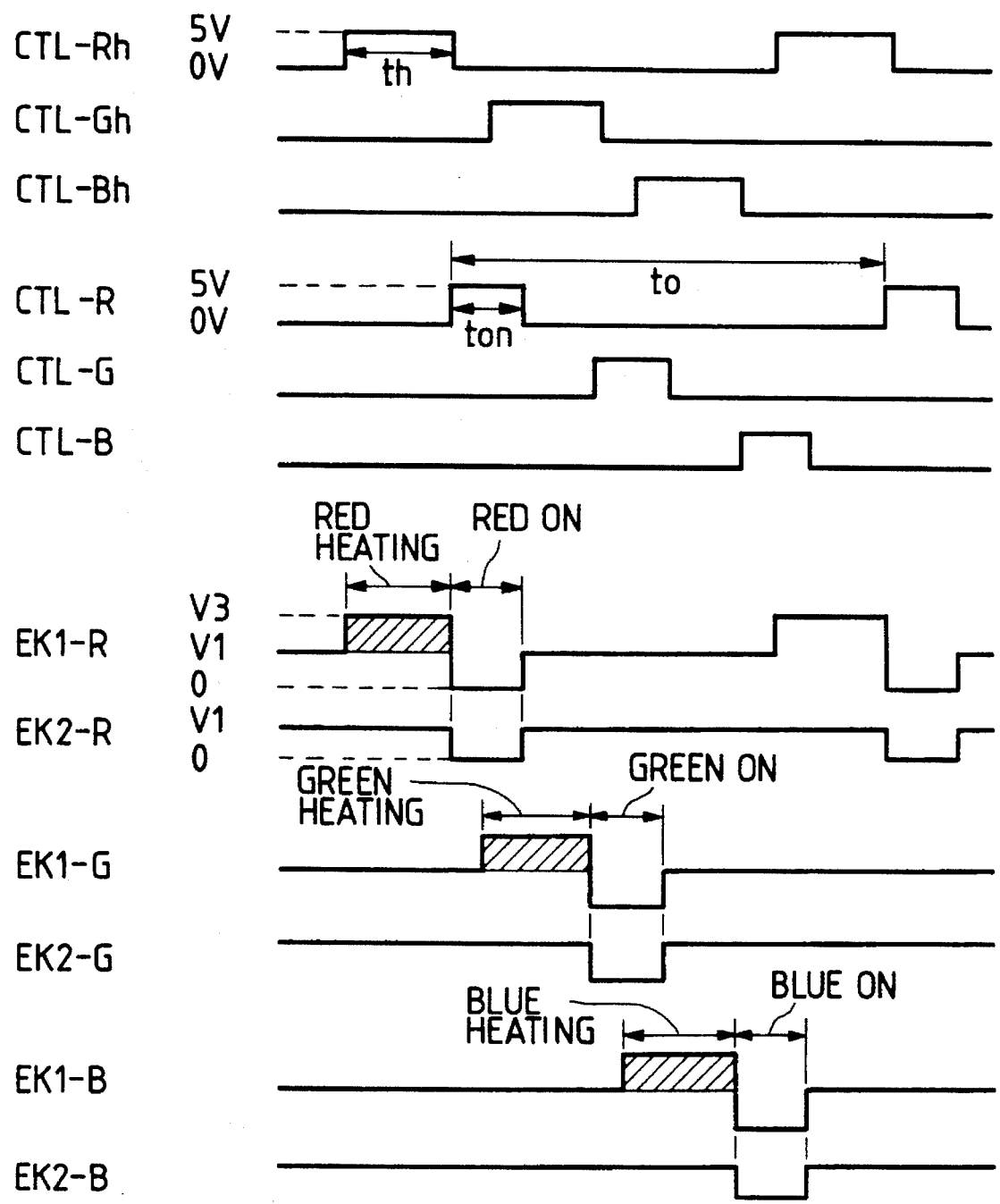
FIG. 15 is a timing chart illustrative of an operation of the cathode drive circuit 166.

FIG. 15 is a timing chart showing the operation of the cathode drive circuit 166.

As shown in FIG. 15, the drive signals CTL-Rh, CTL-R for the red color, the drive signals CTL-Gh, CTL-G for the green color, and the drive signals CTL-Bh, CTL-B for the blue color are generated 120° out of phase with one another. The operation of each color is the same as the operation shown in FIG. 5.

The three-color light-emitting tube can, of course, be driven by the three circuits, the construction of each of which is the same as that shown in FIG. 7. In such a case, the operation shown in FIG. 8 is performed per color. The operations of the three colors are 120° out of phase with one another.

While the preferred embodiments of the invention have been described above, the invention is not limited to them, but may be embodied in various other modes.

As described in the foregoing, the invention is characterized as arranging a dummy period in which no heating or lighting is effected during a lighting cycle and making the dummy period and the lighting period variable. Therefore, even if the lighting period is variably adjusted, the heating duty cycle can be maintained constant, thereby allowing the life of the lighting device to be increased.

What is claimed is:

1. A method of driving a cathodeluminescence lighting device, comprising the steps of:

heating a cathode of said cathodeluminescence lighting device by electric conduction;

emitting light by causing the cathode to release electrons absent conduction to the cathode once said cathode is heated; and delaying initiation of said heating step in a subsequent lighting cycle for a period during which said cathode is not heated and said release of said electrons is terminated, wherein said lighting cycle includes said heating step, said light-emitting step, and said delaying step;

wherein said heating, light-emitting, and delaying steps are repeated at predetermined lighting cycles, and at least a period of said light-emitting step and a period of said delaying step are variable.

2. The method according to claim 1, wherein a ratio of a period of said heating step to the lighting cycle is maintained constant.

3. A method of driving a cathodeluminescence lighting device, comprising the steps of:

heating a cathode of said cathodeluminescence lighting device by electric conduction;

emitting light by causing the cathode to release electrons absent conduction to the cathode once said cathode is heated; and delaying initiation of said heating step in a subsequent lighting cycle for a period during which said cathode is not heated and said release of said electrons is terminated, wherein said lighting cycle includes said heating step, said light-emitting step, and said delaying step;

wherein said heating, light-emitting, and delaying steps are repeated at predetermined lighting cycles, and at least a period of said light-emitting step and a period of said delaying step are variable;

wherein said method further comprises the step of controlling timings of said heating step, said light-emitting step, and said delaying step, said step of controlling timings determining a timing of said light-emitting step independently of the timings of said heating step and of said delaying step and the timings of said heating step and of said delaying step dependent on the timing of said light-emitting step.

4. An apparatus for driving a cathodeluminescence type lighting device having a control grid arranged between a cathode and an anode, said apparatus comprising:

a first control section for controlling a potential of a first terminal of said cathode; and a second control section for controlling a potential of a second terminal of said cathode;

said first control section and said second control section operating during a lighting period, a heating period, and a dummy period, respectively, wherein said lighting period, said heating period, and said dummy period are repeated at predetermined lighting cycles and are successively generated;

said first control section controlling the potential of the first terminal to a potential lower than a potential of said control grid during said lighting period, and controlling the potential of the first terminal to a potential higher than the potential of said control grid during periods other than said lighting period; and said second control section controlling the potential of the second terminal to a potential higher than the potential of said control grid and different from the potential of the first terminal during said heating period, and controlling the potential of the second terminal to a potential equal to the potential of the first terminal during periods other than said heating period.

5. The apparatus according to claim 4, wherein said second control section opens a current loop passing through said cathode during periods other than said heating period so that the potential of the second terminal becomes equal to the potential of the first terminal.

6. The apparatus according to claim 4, wherein said second control section controls the potential of the second terminal to a potential higher than the potential of the first terminal during said heating period.

7. The apparatus according to claim 4, wherein said second control section controls the potential of the second terminal to a potential lower than the potential of the first terminal during said heating period.

8. The apparatus according to claim 4, wherein said first control section operates in response to a lighting signal indicating said lighting period;

said second control section operates in response to a heating signal indicating said heating period;

said apparatus further comprising:

a signal generating section for generating said lighting signal and said heating signal, said signal generating section determining a timing for generating said lighting signal independently of said heating signal and a timing for generating said heating signal dependent on said lighting signal.

* * * * *